United States Patent [19]
Barefoot et al.

[11] 3,805,768
[45] Apr. 23, 1974

[54] ELECTROMAGNETIC BLOOD FLOW PROBE

[75] Inventors: Charles A. Barefoot; Joseph M. McWethy, both of Winston-Salem, N.C.

[73] Assignee: Carolina Medical Electronics, Inc., King, N.C.

[22] Filed: Apr. 11, 1972

[21] Appl. No.: 242,931

[52] U.S. Cl. ............... 128/2.05 F, 73/194 EM
[51] Int. Cl. ..................... A61b 5/02, G01f 1/00
[58] Field of Search ............ 128/2.05 F, 2.05 V; 73/194 EM

[56] References Cited
UNITED STATES PATENTS

| | | | |
|---|---|---|---|
| 3,316,762 | 5/1967 | Westersten | 73/194 EM |
| 3,696,674 | 10/1972 | Spencer | 73/194 EM |
| 3,659,591 | 5/1972 | Doll et al. | 128/2.05 F |
| 3,479,871 | 11/1969 | Cushing | 73/194 EM |
| 3,722,505 | 3/1973 | Kolin | 128/2.05 F |
| 3,550,446 | 12/1970 | Tucker et al. | 73/194 EM |
| 3,449,951 | 6/1969 | Westersten | 73/194 EM |
| 3,717,031 | 2/1973 | Biscar | 73/194 EM |

*Primary Examiner*—Kyle L. Howell

[57] ABSTRACT

An electromagnetic blood flow probe for measuring blood flow having at least two separable and connectable coil segments cooperatively connected to an appropriate switching device selectively movable from a first position where the segments are connected to form a single coil having a given polarity to a second position where the segments are connected separately with opposite polarities so that the coil segments may be energized to eliminate or reorient the flux field and reflect an electrical zero without physically terminating blood flow in a vessel.

10 Claims, 5 Drawing Figures

PATENTED APR 23 1974   3,805,768
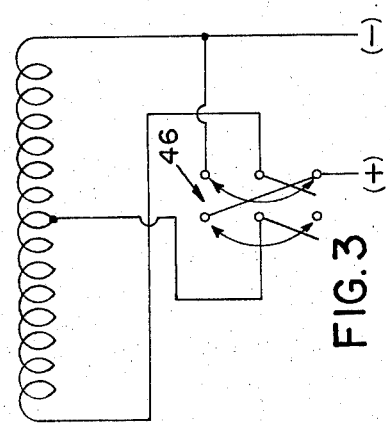
FIG. 3
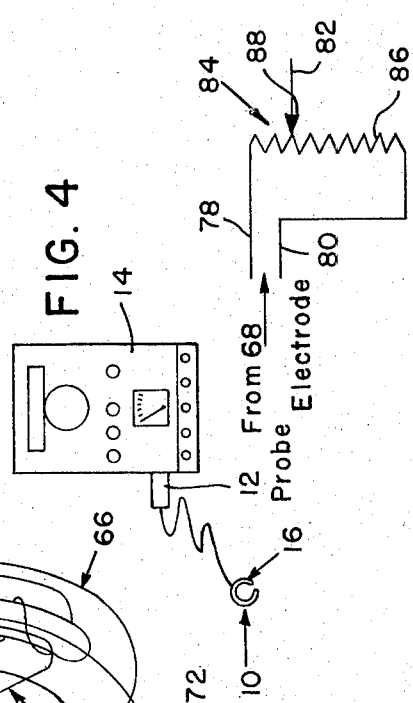
FIG. 4
FIG. 5
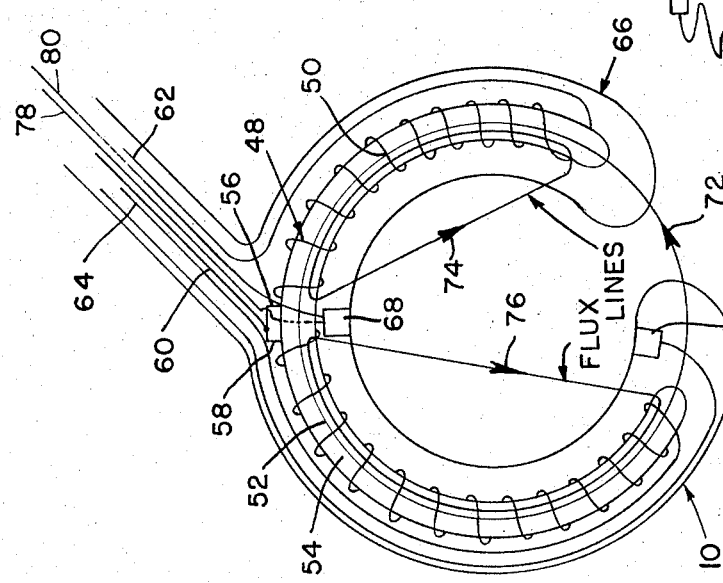
FIG. 2
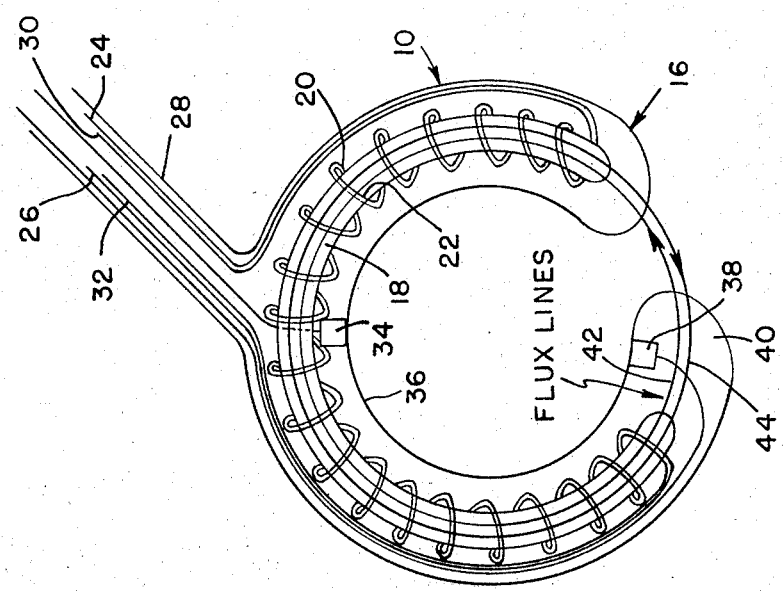
FIG. 1

3,805,768

ELECTROMAGNETIC BLOW PROBE

BACKGROUND, BRIEF SUMMARY AND OBJECTIVES OF THE INVENTION

This invention relates to flow metering devices and more particularly to electromagnetic blood flow probes or sensors designed for acute, implantation and extra corporeal usage in living creatures to monitor the rate of flow of blood through particular vessels of the vascular system.

There is an ever-increasing interest in the determination of the rate of blood flow through unopened blood vessels in conscious and anethesized mammals which extends beyond just an interest in hemodynamics. Blood flow measurement can also provide a wealth of information about the organs of the body. For example, the rate of blood supply to an organ is the determining factor in the regulation of oxygen supply, hormones and nutrient materials as well as the rate of removal of metabolic products. The blood flow through an organ, when correlated with its rate of activity, can be used to follow variations in the organ's activity in response to a variety of stimuli and inhibiting factors.

It was determined many years ago that the continuous recording of blood flow through blood vessels can be accomplished by the measurement of the electromotive force generated by the blood flowing transverse to a magnetic field. In the case of a conduit such as an artery, assuming an axially symmetrical flow, the induced EMF is a linear function of the average fluid discharge. In the case where the conductivity of the conduit is likened to blood vessels, it is possible to detect flow signals by establishing electrical contact with two points on the outside wall of the conduit, preferably at opposite ends of a diameter perpendicular to the magnetic field.

A great variety of flow probes or sensors have been developed to obtain blood flow measurements. These include extra-corporeal and catheter types, all of which have certain advantages for particular situations. Basically, these probes include a housing, arcuate or linear in design depending on the type of probe involved, within which is positioned an electromagnet for creating a flux field. Two electrodes are strategically mounted proximate the created flux field to monitor the voltage induced when conductive blood flows through the created flux field.

The elctromagnet of the various probes referred to above has been conventionally wound in a convoluted manner wherein a flux field is created in the area of blood flow. This can occur at different locations about the probe depending upon core design, coil windings and other factors. In order to make certain that the induced voltage generated by the flowing blood is accurately reflecting blood flow and is not being contaminated by stray signals or other inherent limitations of the probe, it has been necessary from time to time during use to occlude the blood vessel and determine zero blood flow momentarily in order to check the accuracy of the indicated flow signal. When blood flow is stopped, a zero reading should be indicated by the blood flowmeter since no conductor (blood) is passing through the flux field at that time. However, if a signal other than zero is indicated, the probe and/or flowmeter need adjustments or tuning to compensate for the unwanted signal.

Obviously, occluding the blood vessel to check the accuracy of the indicated blood flow is not desirable in that it may cause tissue, vessel or organ damage. Additionally, the process of physically stopping blood flow within a vessel is a tedious and time consuming one and often causes interruptions and delays in the doctor's planned activities with the patient. Under some circumstances, no vessel occlusion is possible.

The present invention has been developed to provide means to check the accuracy of the indicated blood flow, i.e., obtain an electrical zero reading without occluding the vessel and terminating blood flow. This is accomplished by forming an electromagnet to create the flux field from at least two separable and connectable coil segments. These segments are electrically connected to a switching device which will, in one position, connect the segments to form a single coil having single flux field for reading blood flow and which will, in a second position, connect the coil segments separately so that they produce two opposing flux fields to indicate zero flow. The second position will, in one embodiment, create two adjacent and separate flux fields which are equal in strength when the two coil segments are equal in turns and wire size. In another embodiment, the fields are generally parallel to the plane of the electrodes. Thus the flux fields are either cancelled or oriented in a manner so that no induced voltage is created. The reading of the blood flow at this time will result in an electrical zero, thus eliminating the need to physically terminate blood flow.

It is therefore, a primary object of this invention to provide a blood flow probe capable of indicating electrical zero without the termination of blood flow.

Another object of the present invention is to provide a blood flow probe of the type described utilizing an electromagnet having separable and connectable coil segments used to create a field of flux.

Still another object of the present invention is to provide a blood flow probe of the type described having separable and connectable coil segments that are selectively connected by a switching device to change a single flux field into one that is reoriented or that is made up of two opposing flux fields.

These and other objects of the present invention will become more apparent from a consideration of the following detailed specification taken in conjunction with the accompanying drawings constituting a part hereof in which like characters of reference designate like parts throughout the several views.

FIGURE DESCRIPTION

FIG. 1 is a schematic plan view of the primary embodiment of the present invention showing the two separable and connectable coil segments positioned about an arcuately shaped core.

FIG. 2 is a schematic plan view of an alternative embodiment of the present invention showing the two separable and connectable coil segments positioned on an arcuately shaped core.

FIG. 3 is a circuit diagram of the separable and connectable coil segments wired to the switching device.

FIG. 4 is a front elevational perspective view of a flowmeter to which is connected the blood flow probe of the present invention.

FIG. 5 is a schematic view of the balancing device which may be used in the present inventive concept to remove unwanted signals.

DETAILED DESCRIPTION OF THE DISCLOSURE

Referring now to the drawings and particularly to FIG. 4, an arcuately shaped blood flow probe generally designated as 10 is appropriately connected electrically to a plug 12 which is received by a flowmeter 14 in a conventional manner. The flowmeter is preferably of the type now manufactured by Carolina Medical Electronics, Inc. and is commercially available. The probe 10 embodying the present invention is covered by a housing 16 formed of an epoxy resin or a suitable like material which will maintain all components in a fixed relationship, each with the other to insure consistency in readings and to provide suitable insulation for the entire assembly.

Internally, the primary embodiment of probe 10 incorporating the present invention (see FIG. 1) preferably contains an arcuately shaped core 18 wound with two juxtaposed coil segments 20 and 22 which are wound uniformly about core 18 as shown. The two ends 24 and 26 of coil segment 20 are extended around the core 18 within housing 16 and then away from the probe through a tubular conduit 28 and on to a switching component which will be subsequently described in detail. The ends 30 and 32 of coil segment 22 are similarly positioned.

A first electrode 34 is fixedly positioned to be exposed on the inside wall 36 of the housing 16 at a location which preferably falls approximately at the midpoint of core 18. A second electrode 38 is similarly positioned for exposure on the inside housing wall 36 at the end of one leg 40 of housing 16 and opposite the first electrode 34. Electrodes 34 and 38 are selectively positioned to detect flow signals by establishing electrical contact with a conductive blood vessel in a vessel encircled by the probe. The electrodes are positioned at opposite ends of a diameter perpendicular to the magnetic fields of flux created when the elctromagnet is energized.

Two operating arrangements are available for the probe when using the juxtaposed coil segments 20 and 22 of FIG. 1 and an appropriate switching device such as the one to be described subsequently. If, for example, the two coils are combined to form a single coil which will, upon energization, assume a fixed polarity, a flux field generally represented by flux line 42 will be established. If, however, the coil segments 20 and 22 are separately connected and energized with opposite polarities, two separate flux fields represented by flux lines 42 and 44 will be established. Since these flux fields are equal and opposite (assuming the wire size and turns are equal for the coil segments), the flux field is eliminated, blood flow through a vessel encompassed by core 18 will not induce a voltage, and no reading will be observed. This represents the electrical zero position. When coil segments 20 and 22 are combined to form a single core with a single field of flux through the area of blood flow, a voltage proportional to the rate of flow is induced and sensed by electrodes 34 and 38.

An appropriate switching device is shown in the circuit diagram of FIG. 3. The device utilizes a switch 46 which will, when actuated, shift the connection of segments 20 and 22 from a combining connection forming one coil to a separate connection forming two independent coils having opposite polarities. Thus the operator need only actuate switch 46 to shift from reading blood flow to a position for observing the electrical zero. Note that no physical manipulation of the vessel is required and that only electrical changes are needed to shift from the blood flow reading position to the electrical zero position.

FIG. 2 illustrates an alternative but equally effective embodiment of the present invention wherein a coil shown generally as 48 is made up of two separable and connectable coil segments 50 and 52 which are wound about an arcuately shaped core 54 as shown. The two adjacent ends 56 and 58 of segments 50 and 52 are joined to form a single end 60. The two other ends 62 and 64 of segments 50 and 52 extend through and eventually out of housing 66 to the switching component previously described and illustrated in FIG. 3.

Electrodes 68 and 70 are fixed in the housing as previously described with reference to the primary embodiment to detect flow signals by establishing electrical contact with conductive blood in a vessel and circled by the probe and are preferably, though not necessarily, placed at opposite ends of a diameter perpendicular to the magnetic field created when the electromagnet is energized and blood flow measurements are desired.

Here again, fields of flux can be created in either of two ways by appropriate connections with coil segments 50 and 52. If, for example, the two coils are connected in series to form a single coil which will, upon energization, assume a fixed polarity, a flux field represented by flux line 72 will be established. Alternatively, if the segments 50 and 52 are separately connected and energized with opposite polarities, two flux fields 74 and 76 will be established. Since the flux lines are essentially parallel with the sensing electrodes, no voltage would be generated by the flow of blood, The field created when segments 50 and 52 are combined in series will be perpendicular to the conductive blood flowing within the vessel positioned in the gap of core 54 and carried segments 50 and 52 and an induced voltage will be sensed by electrodes 68 and 70.

The obvious result of the two possible connections of segments 50 and 52 is that a blood flow signal is sensed when these segments are wired in series and no blood flow signal is sensed when they are separately connected with opposite polarities. The separability of these segments enables an electrical zero reading without terminating blood flow within the vessel encircled by core 54 and carried segments 50 and 52.

The flowmeter oftentimes picks up voltage signals caused by the probe 10 acting as a transformer when the alternating magnetic field energization induces a signal into the blood which is in turn picked up by the electrodes and mingled with the induced voltage reflecting the blood flow reading. This pseudo flow signal is an annoyance because it is often difficult and sometimes impossible to distinguish it from real flow readings.

In an effort to balance out the unwanted signal created by this transformer effect, it has been found appropriate to connect two leads 78 and 80 (FIG. 5) which eventually form one electrode conductor 82 to a single electrode between which is inserted a balancing potentiometer indicated generally as 84. When a probe is flowmeter-connected and positioned about a blood vessel for readings, it is necessary that no initial potential difference exist between the electrodes so that a true blood flow reading resulting from only the fluid flow through the magnetic field be obtained. The variable resistor 86 has its wiper 88 extending to form electrode lead 82 and allows any unwanted initial potential difference between electrodes to be balanced out by an appropriate IR drop across a selected value of the resistor which thus establishes a more favorable condition for a zer or no potential reference upon which accurate blood velocity and flow readings may be reflected.

It will be apparent from the foregoing disclosure that switching techniques and devices for particularly designed coils can eliminate or reorient the flux fields to provide a means for checking the accuracy of the blood flow measuring equipment. It should also be recognized that similar results can be obtained by providing one or more additional electrode lead pairs selectively located on the probe to obtain a specific relationship with the core, coil, and flux field established thereby. Appropriate swtiching devices and circuits can then be used to activate one pair of electrodes and simultaneously deactivate another.

It is apparent that many modifications and variations may be made in the construction and arrangement of the electromagnet, the electrodes, the body housing and the coil configuration as well as other phases of the present inventive concept in light of the above teachings without departing from the real spirit and purpose of this invention. Such modification of parts as well as the use of equivalents to those herein illustrated and described are reasonably included and contemplated.

We claim:

1. For use in a blood flow measuring device: and electromagnetic blood flow probe having a housing, magnetic means within the housing establishing a flux field proximate blood flow and electrode means positioned within the flux field and in the housing to sense the induced voltage generated when conductive blood flows through the flux field, electrical conductor means connected to said electrode means and extending outwardly of said housing, said flux establishing means including a coil forming at least a part of said magnetic means having at least two electrically separable and connectable segments; switching means selectively movable from a first position to connect said segments to form a single coil having one polarity to a second position to connect said coil separately with opposite polarities; and a voltage source operable with that switching to energize said single coil in the first position to produce a flux field for sensing blood flow and to energize said coils in the second position, eliminate the effects of the flux field and reflect electrical zero without terminating blood flow.

2. The device as claimed in claim 1 further comprising an arcuately shaped core carrying said coil segments.

3. The device as claimed in claim 2 wherein said coil is circular to conform to the exterior of a blood vessel.

4. The device as claimed in claim 1 wherein said coil segments are positioned end-to-end within said housing.

5. The device as claimed in claim 1 wherein said coil segments are juxtaposed within said housing.

6. The device as claimed in claim 3 where said coil segments are positioned end-to-end within said housing and about said core.

7. The device as claimed in claim 3 wherein said coil segments are juxtaposed within said housing and about said core.

8. The device as claimed in claim 1 further comprising potential balancing means adapted to compensate for unwanted induced potentials.

9. A device as claimed in claim 1 and including flow meter means connected to said electrical conductor means.

10. A device as claimed in claim 9 including potential balancing means adapted to compensate for unwanted induced potentials.

* * * * *